(12) United States Patent
Downey

(10) Patent No.: US 6,690,720 B1
(45) Date of Patent: Feb. 10, 2004

(54) AUTOMATED TESTING OF MODEM TRAINING

(75) Inventor: William S. Downey, Franklin, MA (US)

(73) Assignee: Telesector Resources Group, Inc., White Plains, NY (US)

( * ) Notice: Subject to any disclaimer, the term of this patent is extended or adjusted under 35 U.S.C. 154(b) by 0 days.

(21) Appl. No.: 09/520,245

(22) Filed: Mar. 7, 2000

Related U.S. Application Data

(60) Provisional application No. 60/124,212, filed on Mar. 15, 1999.

(51) Int. Cl.[7] .............................. H04B 1/38; H04Q 1/20
(52) U.S. Cl. ....................................... 375/222; 375/224
(58) Field of Search .................................. 375/222, 224; 379/21; 714/716, 717; 370/249

(56) References Cited

U.S. PATENT DOCUMENTS

| | | | | |
|---|---|---|---|---|
| 3,956,601 A | * | 5/1976 | Harris et al. ................... | 379/21 |
| 4,385,384 A | * | 5/1983 | Rosbury et al. ............ | 714/717 |
| 5,173,896 A | * | 12/1992 | Dariano ...................... | 370/249 |
| 5,546,379 A | * | 8/1996 | Thaweethai et al. ........ | 370/254 |
| 5,666,152 A | * | 9/1997 | Stoker ...................... | 348/14.01 |
| 5,852,631 A | * | 12/1998 | Scott ........................ | 375/222 |
| 5,881,066 A | * | 3/1999 | Lepitre ...................... | 714/716 |
| 6,278,729 B1 | * | 8/2001 | Thompson .................. | 375/224 |
| 6,311,291 B1 | * | 10/2001 | Barrett, Sr. .................. | 714/25 |
| 6,480,531 B1 | * | 11/2002 | Malhotra ..................... | 375/222 |

* cited by examiner

Primary Examiner—Stephen Chin
Assistant Examiner—Lawrence Williams
(74) Attorney, Agent, or Firm—Ohlandt, Greeley, Ruggiero & Perle, LLP

(57) ABSTRACT

There is provided a system for testing modem training of a first modem and a second modem. The system includes a line simulator interposed between the first and second modems, and a processor for (a) controlling the line simulator to simulate a line length, (b) controlling the first modem to train with the second modem, and (c) saving data related to the modem training.

16 Claims, 3 Drawing Sheets

AUTOMATED TESTING OF MODEM TRAINING

RELATED APPLICATION

The present application is claiming priority in provisional patent application Serial No. 60/124,212, filed on Mar. 15, 1999.

BACKGROUND OF THE INVENTION

1. Field of the Invention

The present invention relates to modem training, and more particularly, to automated testing of an ability of modems to train over various line lengths and in the presence of line impairments.

2. Description of the Prior Art

Transmission line length, which contributes to signal attenuation, and noise adversely affect the ability of modems to communicate with one another. Communication between a pair of modems commences with a training session during which the modems exchange data in accordance with a predefined protocol. Training is a synchronization process that allows the modems to evaluate transmission line conditions in order to establish a maximum sustainable rate of data transmission.

Testing of modem training, sometimes referred to as rate and reach testing, is a manual process. The modems under test are connected to a line simulator that is capable of simulating a transmission line length and introducing a noise impairment. Test personnel begin by manually setting up the line simulator to simulate a minimum line length with a noise impairment. The test personnel wait for the modems to train with one another, and then they manually read and record the test results. The test personnel continue by repeating the training test for a plurality of simulated line lengths, typically in increments of 1000 feet, up to some maximum simulated line length. This technique of manually testing and recording data is labor intensive and prone to error.

SUMMARY OF THE INVENTION

It is an object of the present invention to provide a system for automating the testing of modem training.

It is another object of the present invention to provide such a system that tests the modem training for a plurality of simulated line lengths and noise impairments.

It is a further object of the present invention to provide such a system that automatically records data related to the test.

It is still a further object of the present invention to provide such a system in which the tests are controlled from a processor via a computer network.

These and other objects of the present invention are achieved by a system for testing modem training of a first modem and a second modem, including a line simulator interposed between the first modem and the second modem, and a processor with (a) means for controlling the line simulator to simulate a line length, (b) means for controlling the first modem to train with the second modem; and (c) means for saving data related to the modem training.

DESCRIPTION OF THE INVENTION

The present invention is a system that includes a software application for automatic testing and recording of data related to modem training. The application controls one or more line simulators, also known as loop simulators, to simulate various lengths of transmission media, typically a twisted pair copper loop, and to inject various noise impairments into the simulated line. The recorded data, which includes line simulator configuration data, modem configuration data and test results, is written to a database from which it can be accessed for further review and evaluation.

Figure 1:
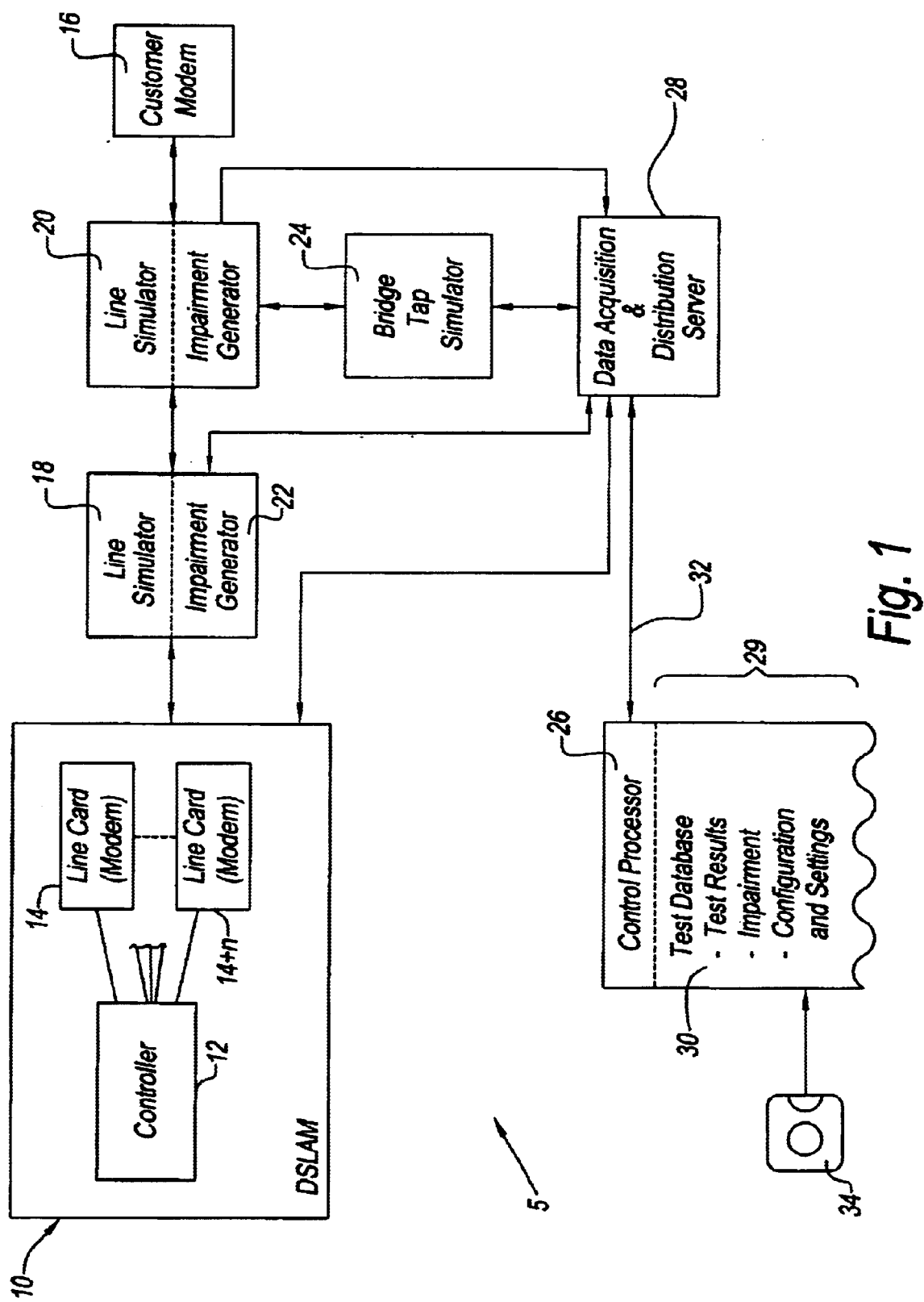
FIG. 1 is a block diagram of an equipment configuration for testing modem training in accordance with the present invention.

FIG. 1 is a block diagram of an equipment configuration generally represented by reference numeral 5 for automated testing of modem training in accordance with the present invention. Configuration 5 includes a Digital Subscriber Line Access Multiplexer (DSLAM) 10, a customer modem 16, a pair of line simulators 18 and 20, a bridge tap simulator 24, a server 28, and a control processor 26.

DSLAM 10 includes a controller 12 that controls one or more line card modems 14 ... 14 +n. One line card modem 14 is matched to communicate with customer modem 16. The training of a line card modem 14 and customer modem 16 will be tested by the system described herein.

Line simulators 18, 20 are interposed in a communication link between DSLAM 10 and customer modem 16. Each line simulator 18, 20 has the ability to simulate a line/loop of a variable length. Such line simulators 18, 20 are commercially available from various manufacturers. One such manufacturer is DLS TestWorks, 169 Colonnade Road, Nepean, Ontario K2E 7J4, Canada, which manufactures the DLS90 and DLS400 line simulators. Preferably, line simulators 18, 20 include a resident impairment generator 22 to further impose a noise impairment on the simulated line. Alternatively, the impairment can be provided by a stand alone impairment generator (not shown) such as an NSA400, also available from DLS TestWorks. The present invention contemplates the use of any line simulator and any impairment generator.

Line simulators 18, 20 are "serially" connected to enable simulation of a longer line length than could be provided by a single simulator. They also provide intermediate points along the simulated line lengths where bridge taps can be connected. Bridge tap simulator 24, which can simulate an open circuited transmission line, is coupled to line simulator 20. Bridge tap simulator 24 can be connected to either line simulator 18 or 20, and it can be connected to either the right or the left side of a simulator. This allows for setting a bridge tap at a near end (central office), far end (subscriber, as depicted in the FIG. 1), or in at a midpoint of a loop. The system also can support the use of more than one line simulator to simulate multiple bridge taps at any or all of these locations. That is, more that one bridge tap simulator may be attached at the subscriber end of the loop, near modem 16, and multiple bridge tap simulators may be connected at either end of line simulators 18 and 20.

The system can be set up to vary the lengths of the line and bridge tap simulators to more closely mimic real line conditions. For example, two line simulators and two bridge tap simulators may be used. One bridge tap simulator can be attached between the line simulators, and the other can be attached at the subscriber's end. The simulators' loop lengths can be altered in various sequences to produce a multitude of line conditions.

When two or more line simulators are used to simulate a line length, the total simulated line length is allocated between the simulators. Thus, if the line simulators 18, 20 are accurate only to a maximum simulated line length, the lengths allocated to each simulator line 18, 20 will be less than the maximum length. Furthermore, the line simulators 18, 20 may be combined with actual loop lengths to perform tests that include the actual loop lengths.

A control processor 26, which includes an associated memory 29 for the storage of data and instructions, controls the operation of DSLAM 10, line simulators 18 and 20, and bridge tap simulator 24. Memory 29 also contains a test database 30 for the storage of test parameters, i.e., line simulator configuration data and modem configuration data, and test results. Control processor 26 can be a general-purpose computer, or it can be implemented with special purpose discrete circuitry or firmware.

Server 28 is a network interface that couples DSLAM 10, line simulators 18 and 20, and bridge tap simulator 24 to a computer network 32. Computer network 32 is coupled to control processor 26. Thus, control processor 26 can exercise control of, and likewise receive data from, DSLAM 10, line simulators 18 and 20, and bridge tap simulator 24, via server 28 and computer network 32 while at a remote location.

Server 28 allows for the execution of rate and reach testing from a remote location. The majority of the equipment needed to perform a test could be located in a location such as Rockville, Md., while control processor 26 could be in another location such as White Plains, N.Y. This allows for an efficient utilization of personnel and equipment. For example, personnel who work in White Plains do not need to travel to Rockville to conduct a test. In addition, the equipment required for the test does not need to be installed at both locations.

In a basic configuration only one line simulator 18, 20 is needed, and bridge tap 24 and server 28 are optional. Although a line card modem 14 is required, it need not be installed within a DSLAM 10. Accordingly, DSLAM 10 and controller 12 are also optional.

Figure 2:
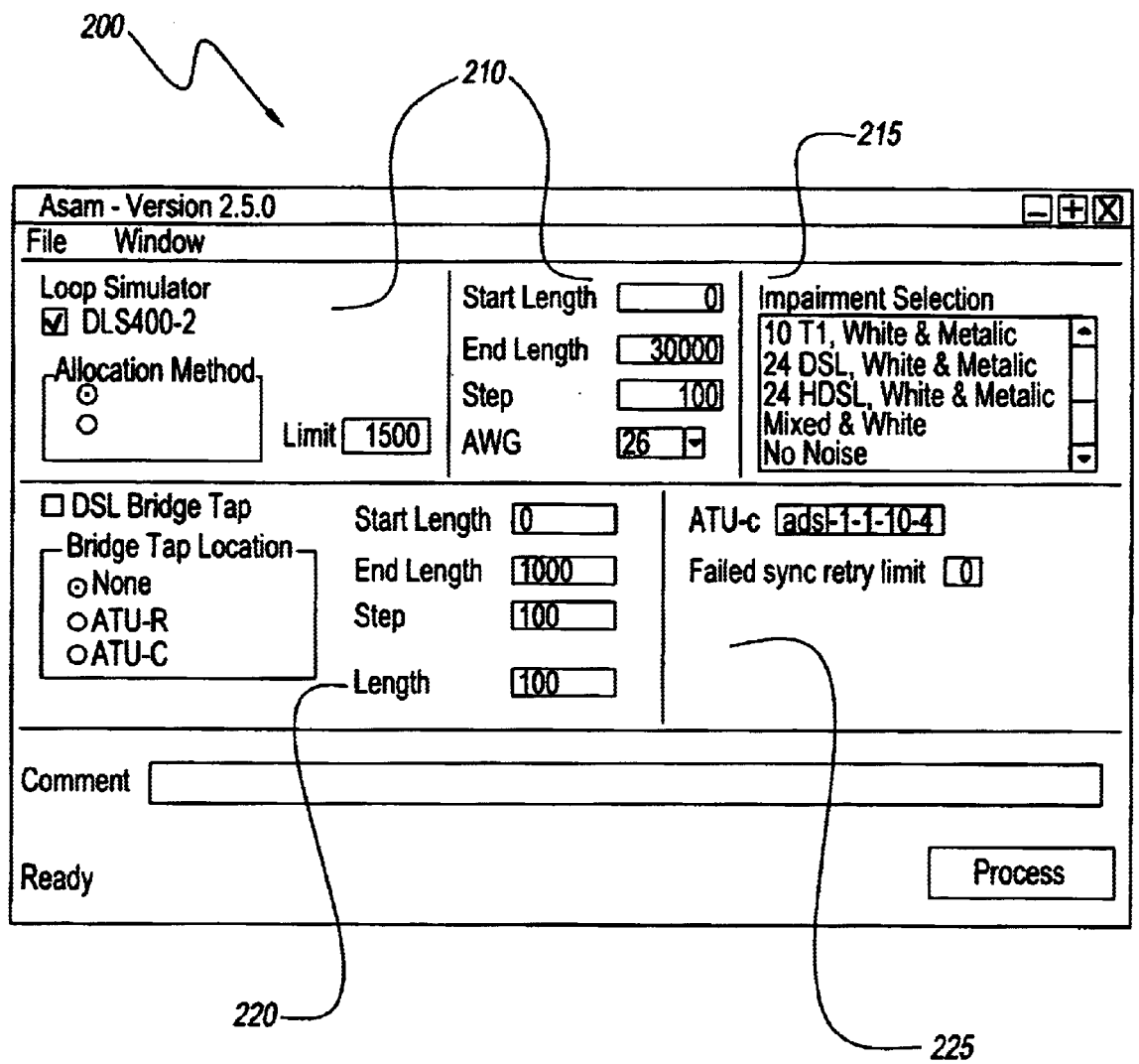
FIG. 2 is an illustration of a graphical user interface showing various parameters that can be specified by a developer of a modem training test for the system shown in FIG. 1.

FIG. 2 is an illustration of an exemplary graphical user interface (GUI) 200 on a display terminal (not shown) that is coupled to control processor 26. Through GUI 200, a developer or test personnel can specify various operating and test parameters for a modem training test. For example, GUI 200 includes (a) loop simulator fields 210 for specifying a line simulator, start length, end length, step size and line type, (b) impairment selection fields 215, (c) bridge tap fields 220 for specifying a bridge simulator, bridge tap location, start length, end length, step size and length, and (d) modem identification 225. During a test, a bridge tap line simulator may not be available. In this situation, the test personnel may wish to use an actual physical wire. The "Length" field on the GUI allows the test personnel to record the length of the wire to the test database 30.

Control processor 26 includes a program having three main software modules, that is, (1) a main module, (2) a line simulator module and (3) a DSLAM module. The general function of each of these modules is summarized in the following several paragraphs.

The main module provides the graphical user interface, i.e., GUI 200, and central control logic for the execution of the modem training tests.

The line simulator module contains a set of functions for setting or querying line simulators 18 and 20, and bridge tap simulator 24. Since the general case contemplates the use of any line simulator 18, 20, more than one line simulator module exists, and a particular line simulator module is invoked for a particular type of line simulator 18, 20.

The DSLAM module provides an interface to DSLAM 10. DSLAMs are available from several manufacturers, including (a) Alcatel, 2912 Wake Forest Road, Raleigh, N.C. 27609, and (b) Westell, 750 North Commons Drive, Aurora, Ill. 60504. The present invention does not require any particular DSLAM, but instead contemplates the use of any DSLAM. Accordingly, more than one DSLAM software module exists, and a particular DSLAM module is invoked for a particular type of DSLAM.

DSLAM communication is defined in two planes, the Communication Protocol Plane and the Command Set Plane. The Communication Protocol Plane refers to both the physical and logical method by which a DSLAM is connected to another device. Some DSLAM devices are connected to their external control systems via an RS-232 bus, others are connected via an ethernet bus and still others are connected via SONET DS-3, OC-3 or OC-12.

In addition to the physical connection, a communication protocol must be utilized on the physical media described above. Various protocols exist to interface with the various DSLAM products. Some manufacturers deploy a Transactional Language One (TL-1) over an RS-232 serial line to interface with their DSLAM equipment. Other manufacturers use Simple Network Management Protocol (SNMP) over Ethernet or Fast Ethernet to control the DSLAM. Still others use SNMP over Asynchronous Transfer Mode (ATM) over OC-x to communicate with their equipment.

DSLAM communication also involves a command set utilized to set up various aspects of a DSLAM device and to inquire as to the setup or state of the equipment. Many DSLAM manufacturers have implemented TL-1 for their command set. Although the basic structure of a TL-1 command and the response to that command are standardized, the commands themselves are not. Consequently, each DSLAM manufacturer uses a unique command set for communication with a specific DSLAM. Likewise, SNMP is an international standard for controlling various networked equipment using SNMP "Sets" and SNMP "Gets" that, in turn, require use of manufacturer-specified Management Information Bases (MIBs).

The functions of the DSLAM module are implemented to provide a standard function set for use by the main module. By implementing the software in this fashion, minimal work is required to develop a DSLAM module for a new DSLAM.

Figure 3:
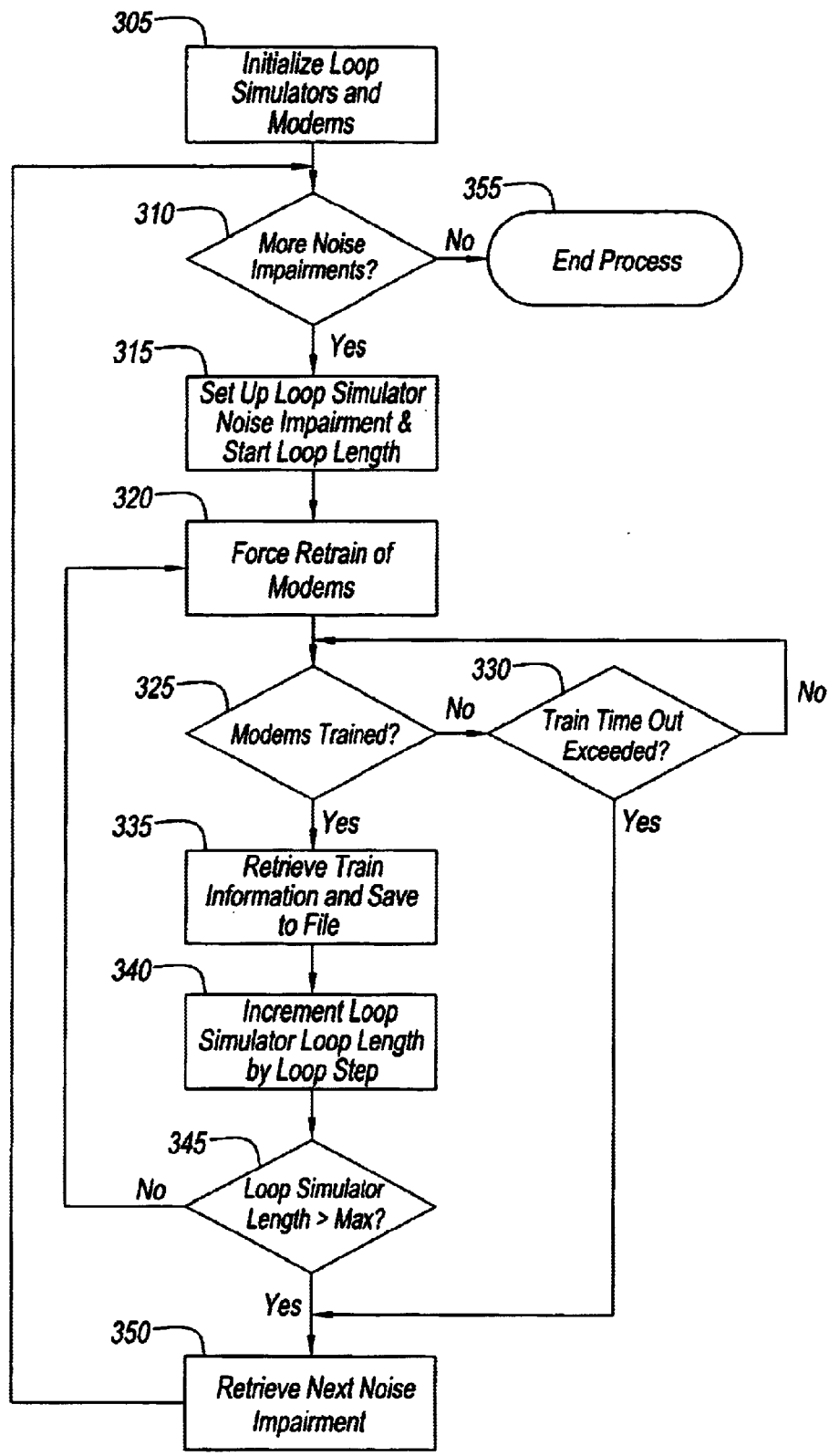
FIG. 3 is a flow chart of a method for testing modem training in accordance with the present invention.

FIG. 3 is a flow diagram of a method for automated testing of modem training according to the present invention. While the procedures required to execute the invention hereof are indicated as already loaded into memory 29 of processor 26, they may be configured on a storage media, such as data memory 34 in FIG. 1, for subsequent loading into memory 29. The method begins with the execution of step 305.

In step 305, control processor 26 sends a command via server 28 to initialize line simulators 18 and 20, and line modem 14. This step includes opening a communication port for, determining the type of, and initializing, DSLAM 10, line simulators 18 and 20, and bridge tap simulator 24. For example, to determine the type of line simulator 18, control processor 26 retrieves a model number, serial number and firmware revision from line simulator 18. Impairment generator 22 is also reset. The method then advances to step 310.

In step 310, control processor 26 determines whether more noise impairments are to be tested. Control processor obtains the noise impairments from test database 30. If no more noise impairments are to be tested, then the training test is completed and the method branches to step 355. If more noise impairments are to be tested, then the method advances to step 315.

In step 315, control processor 26 issues a command to set up line simulators 18 and 20, and bridge tap simulator 24. The setup includes a noise impairment, start loop length and American Wire Gauge (AWG) for the test. Modem 14 is set online. Control processor 26 also records to test database 30 information such as line simulator configuration data, modem configuration data, the serial numbers of the devices that participated in the test, and any additional relevant information. The method then advances to step 320.

In step 320, control processor 26 issue a command to force modems 14 and 16 to train, or retrain. Retraining can be accomplished, for example, by controlling DSLAM 10 to switch modem 14 off-line and thereafter switch it online. This switching sequence causes modems 14 and 16 to automatically retrain. The method then advances to step 325.

In step 325, control processor 26 determines whether modems 14 and 16 are trained, that is, whether the modems have completed their training sequence. A function in the DSLAM software module repeatedly inquires as to the training status of modem 14. If the modems are not trained, then the method advances to step 330. If the modems are trained, then the method branches to step 335.

In step 330, control processor 26 determines whether a training time-out interval has been exceeded. That is, it determines whether the modems have completed their training sequence within the time-out interval. A function in the DSLAM software module supports a time-out feature. The time-out interval is adjustable. If the modems fail to train, for example, in five minutes, the function assumes that the modems are not able to train. If the time-out interval has not been exceeded, then the method loops back to step 325. If the time-out interval has been exceeded, then the method branches to step 350.

In step 335, control processor 26 retrieves test results from DSLAM 10, and records the results to test database 30. The test results include various train statistics, such as, for example, whether the training session was successful, and if so, the achieved data rate. The method then advances to step 340.

In step 340, control processor 26 issues a command to one or both of line simulators 18 and 20 to set up for the next incremental test. For example, line simulator 18 may be commanded to increase the simulated loop length by a predetermined interval, i.e., step size. The method then advances to step 345.

In step 345, control processor 26 determines whether the simulated line length is greater than a predetermined maximum value. If the simulated line length is not greater than the maximum value, then the method loops back to step 320 to perform the next incremental test. If the simulated line length is greater than the maximum value, then the method advances to step 350.

In step 350, control processor 26 obtains the next noise impairment value from test database 30. The method then loops back to step 310.

In step 355, the method for testing modem training ends.

The automated nature of the application permits continuous unattended employment of the system and an evaluation of any desired increment of simulated line length. For example, where manual testing typically tested line lengths in 1000 foot increments, the present system easily tests 100 foot increments in far less time than that required to perform the manual test, and it therefore allows for testing that would not be considered practical in a manual mode.

The system is particularly suited for testing Digital Subscriber Line Access Multiplexer equipment, but it can be applied for testing any analog or digital modem, including the various types of Digital Subscriber Loop (xDSL) equipment. A telecommunications carrier can employ the system for comparison of the performance of various modem systems, and to determine serviceability and rate classes for potential modem subscribers under a variety of line impairment conditions.

It should be understood that various alternatives and modifications could be devised by those skilled in the art. The present invention is intended to embrace all such alternatives, modifications and variances that fall within the scope of the appended claims.

What is claimed is:

1. A system for testing modem training of a first modem and a second modem, comprising:
   a line simulator interposed between said first modem and said second modem; and
   a processor having:
      means for controlling said line simulator to simulate a line length;
      means for controlling said first modem to train with said second modem; and
      means for saving data related to said modem training; wherein said processor executes a processing loop and employs said means for controlling said line simulator, said means for controlling said first modem, and said means for saving data, to incrementally test said modem training for a plurality of simulated line lengths.

2. The system of claim 1, wherein said processor further includes means for controlling said line simulator to impose a noise impairment on said simulated line.

3. The system of claim 1, further comprising a bridge tap simulator coupled to said line simulator, wherein said processor controls said bridge tap simulator to simulate an open transmission line.

4. The system of claim 1, wherein said processor is coupled to said first modem, said second modem and said line simulator via a network server.

5. The system of claim 1, wherein said data includes line simulator configuration data, modem configuration data and test results.

6. An automated method for testing modem training of a first modem and a second modem in a system with a line simulator interposed between said first modem and said second modem, said method comprising the steps of:
   controlling said line simulator to simulate a line length;
   controlling said first modem to train with said second modem; and
   saving data related to said modem training; and repeating said controlling said line simulator, said controlling said first modem, and said saving data, to incrementally test said modem training for a plurality of simulated line lengths.

7. The method of claim 6, further comprising controlling said line simulator to impose a noise impairment on said simulated line.

8. The method of claim 6, wherein said system includes a bridge tap simulator coupled to said line simulator, and said method further comprises controlling said bridge tap simulator to simulate an open transmission line.

9. The method of claim 6, wherein said method is implemented in a processor that is coupled to said first modem, said second modem and said line simulator via a network server.

10. The method of claim 6, wherein said data includes line simulator configuration data, modem configuration data and test results.

11. A storage media including a program for controlling a processor for testing modem training of a first and second modem in a system with a line simulator interposed between said first modem and said second modem, said storage media comprising:

means for controlling said processor to control said line simulator to simulate a line length;

means for controlling said processor to control said first modem to train with said second modem;

means for controlling said processor to save data related to said modem training; and means for controlling said processor to repeatedly invoke said means for controlling said processor to control said line simulator, said means for controlling said processor to control said first modem, and said means for controlling said processor to save data, to incrementally test said modem training for a plurality of simulated line lengths.

12. The storage media of claim 11, further comprising means for controlling said processor to control said line simulator to impose a noise impairment on said simulated line.

13. The storage media of claim 11 wherein said system includes a bridge tap simulator coupled to said line simulator, and said storage media further comprises means for controlling said processor to control said bridge tap simulator to simulate an open transmission line.

14. The storage media of claim 11, wherein said processor is coupled to said first modem, said second modem and said line simulator via a network server.

15. The storage media of claim 11, wherein said data includes line simulator configuration data, modem configuration data and test results.

16. The storage media of claim 11, wherein said means for controlling said processor to control said line simulator, said means for controlling said processor to control said first modem, and said means for controlling said processor to save data are each embodied within the same means.

* * * * *